(12) United States Patent
Fitzpatrick et al.

(10) Patent No.: US 10,543,794 B2
(45) Date of Patent: Jan. 28, 2020

(54) VEHICLE WITH ABRASION-RESISTANT DOOR PANEL

(71) Applicant: Faurecia Interior Systems, Inc., Auburn Hills, MI (US)

(72) Inventors: Robert Fitzpatrick, Holland, MI (US); Brian Dexter, Grand Haven, MI (US); Markus Uhlig, Stuttgart (DE); Desmond O'Regan, Bad Homburg (DE); Matthew Benson, Holland, MI (US); Fabrice Aycoberry, St. Germain en Laye (FR)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 0 days.

(21) Appl. No.: 15/852,641

(22) Filed: Dec. 22, 2017

(65) Prior Publication Data

US 2018/0186306 A1     Jul. 5, 2018

Related U.S. Application Data

(60) Provisional application No. 62/440,660, filed on Dec. 30, 2016.

(51) Int. Cl.
| | |
|---|---|
| *B60R 13/02* | (2006.01) |
| *B60J 5/04* | (2006.01) |
| *B60N 2/14* | (2006.01) |
| *B60N 2/75* | (2018.01) |

(52) U.S. Cl.
CPC .......... *B60R 13/0243* (2013.01); *B60J 5/048* (2013.01); *B60J 5/0413* (2013.01); *B60N 2/14* (2013.01); *B60N 2/767* (2018.02); *B60N 2/773* (2018.02); *B60R 2013/0287* (2013.01)

(58) Field of Classification Search
CPC .... B60R 13/0243; B60N 2/767; B60N 2/773; B60N 2/14; B60J 5/0413; B60J 5/048
USPC ...................................................... 296/146.7
See application file for complete search history.

(56) References Cited

U.S. PATENT DOCUMENTS

| 1,742,447 A | 1/1930 | McKeag |
|---|---|---|
| 5,180,089 A | 1/1993 | Suman et al. |
| 5,527,084 A | 6/1996 | Scherf |
| 5,639,141 A | 6/1997 | Hanemaayer |
| | (Continued) | |

FOREIGN PATENT DOCUMENTS

| DE | 19714404 A1 | 12/1997 |
|---|---|---|
| DE | 102005041735 A1 | 3/2007 |
| | (Continued) | |

*Primary Examiner* — Joseph D. Pape
(74) *Attorney, Agent, or Firm* — Reising Ethington P.C.

(57) ABSTRACT

A personal automotive vehicle includes a door with a door panel that partly defines a reconfigurable passenger cabin. The door panel presents an abrasion-resistant portion to the interior of the passenger cabin at an upper section of the door panel below the window. A seat is mounted in the passenger cabin and can be rotated inwardly to increase the available range of movement of the seat occupant. The abrasion-resistant portion of the door panel is located to prevent scuff-related damage to the door panel when the seat occupant crosses his legs. The abrasion-resistant portion of the door panel can be selectively covered and uncovered by a moveable portion of the door panel, which may include an armrest.

20 Claims, 2 Drawing Sheets

(56) References Cited

U.S. PATENT DOCUMENTS

| | | | |
|---|---|---|---|
| 7,131,685 B2* | 11/2006 | Carrier | B29C 45/1676 |
| | | | 296/146.9 |
| 7,384,092 B2 | 6/2008 | Hodges | |
| 7,537,268 B2 | 5/2009 | Becker et al. | |
| 7,758,102 B2 | 7/2010 | Quigley et al. | |
| 8,182,014 B2 | 5/2012 | Mabuchi et al. | |
| 8,297,684 B1 | 10/2012 | Flamard et al. | |
| 2006/0097544 A1* | 5/2006 | Cowelchuk | B29C 45/1676 |
| | | | 296/146.7 |
| 2013/0320711 A1 | 12/2013 | Nascimento et al. | |
| 2015/0203006 A1 | 7/2015 | Hipshier et al. | |

FOREIGN PATENT DOCUMENTS

| | | |
|---|---|---|
| DE | 102009050968 A1 | 5/2010 |
| DE | 102013202932 A1 | 8/2014 |

\* cited by examiner

VEHICLE WITH ABRASION-RESISTANT DOOR PANEL

TECHNICAL FIELD

The present disclosure relates generally to personal automotive vehicles with reconfigurable passenger cabins and is particularly pertinent to autonomous vehicles.

BACKGROUND

Personal automotive vehicles have evolved over several decades to require less attention from a human driver during vehicle operation. For instance, modern automobiles may be equipped with headlights that self-illuminate in low lighting conditions, windshield wipers that self-activate during rainy weather, or climate-control systems that automatically regulate the temperature of the passenger, to name a few examples. Emerging technologies now enable automobiles to continuously monitor surrounding road and traffic conditions, have real-time knowledge regarding the global position of the vehicle, and to control vehicle acceleration, braking, and navigation based on this information. The trend is toward fully autonomous vehicles, in which little to no attention to vehicle operation is required from vehicle occupants once a destination for the vehicle is determined. In such vehicles, vehicle occupants are free to turn their attention to matters other than driving, such as work-related tasks, entertainment, or relaxation.

During the transition from traditional driver-operated vehicles to fully autonomous vehicles, reconfigurable passenger cabins may be employed to accommodate both a driver mode and an autonomous mode. With driver attention to vehicle operation not required in the autonomous mode, the driver may wish to assume a different or more comfortable seating position than the one required during traditional vehicle operation, in which driver feet must be near the accelerator and brake pedal and driver arms must be able to reach and turn the steering wheel, operate turn signals, etc. Indeed, in traditional driver-operated vehicles, there is very little room available for occupants to assume different seating positions. This is particularly true in the front row of seats where the driver and/or passenger is closely surrounded by a center console, instrument panel(s), arm rests, and steering wheel. It may thus become desirable to increase the amount of free space surrounding the vehicle occupants in the autonomous vehicle mode to allow more freedom of movement. This comes with a whole new set of problems not before encountered in a vehicle passenger cabin.

While certain passenger cabin components have been developed that might be said to increase the free volume of the passenger cabin, they do not address additional problems associated with vehicle occupants shifting their seating positions to non-traditional ones. For example, U.S. Pat. No. 7,384,092 to Hodges and U.S. Pat. No. 7,758,102 to Quigley et al. disclose retractable interior armrests on motor vehicle doors. In each of these examples, the armrest pivots from a horizontal usable position to a vertical position in a recess in the door. These armrests are disclosed for particular use with sliding vehicle doors (e.g., minivan doors) and are useful to reduce the outward distance the door must move while opening to avoid interference between the armrest and the door frame while the door is sliding open.

SUMMARY

In accordance with an embodiment, a personal automotive vehicle having a reconfigurable passenger cabin includes a vehicle body, a door mounted to the vehicle body, and a seat located in the passenger cabin. The door is moveable to provide passenger access into and out of the passenger cabin and includes a window and a door panel that partly defines an interior of the passenger cabin. The seat is coupled with the vehicle body for rotational movement between a forward-facing position and an inwardly-rotated position, and the seat has an inboard side and an opposite outboard side located between the inboard side and the door. The door panel has a lower portion below the window. The lower portion of the door panel includes an upper section that presents an abrasion-resistant portion to the interior of the passenger cabin. The abrasion-resistant portion has an abrasion resistance greater than an abrasion resistance of a different portion of the door panel.

In some embodiments, the door panel includes a moveable portion configured for movement between a first position and a second position. The abrasion-resistant portion is not presented to the interior of the passenger cabin in the first position, and the abrasion-resistant portion is presented to the interior of the passenger cabin in the second position.

In some embodiments in which the door panel includes the moveable portion, the moveable portion at least partly covers the abrasion-resistant portion in the first position and uncovers the abrasion-resistant portion in the second position.

In some embodiments in which the door panel includes the moveable portion, the moveable portion includes the abrasion-resistant portion.

In some embodiments in which the door panel includes the moveable portion, the movement of the moveable portion includes translational movement in forward and rearward directions.

In some embodiments in which the door panel includes the moveable portion, the movement of the moveable portion comprises rotational movement.

In some embodiments in which the door panel includes the moveable portion, the moveable portion is configured to be in the second position only when the seat is in the inwardly-rotated position.

In some embodiments, the door is a non-sliding door.

In some embodiments, the door panel includes an armrest configured for movement between a first position and a second position such that a free volume between the outboard side of the seat and the door is greater when the armrest is in the second position than when the armrest is in the first position.

In some embodiments in which the door panel includes the armrest, the abrasion-resistant portion is not presented to the interior of the passenger cabin in the first position and the abrasion-resistant portion is presented to the interior of the passenger cabin in the second position.

In some embodiments, the passenger cabin is reconfigurable between a driving configuration, in which the seat is in the forward-facing position and the abrasion-resistant portion is not presented to the interior of the passenger cabin, and an autonomous configuration, in which the seat is in the inwardly-rotated position and the abrasion-resistant portion is presented to the interior of the passenger cabin.

In some embodiments, presentation of the abrasion-resistant portion of the door panel is coordinated with movement of the seat.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENT(S)

Described below is a door panel having an abrasion-resistant portion facing the interior of a passenger cabin of a personal automotive vehicle. The abrasion-resistant portion is presented to the interior of the passenger cabin at an upper section of the door panel below a window of the door. A seat is mounted in the passenger cabin and can be rotated inwardly to increase the available range of movement of the seat occupant. Such seats may be found in fully or partially autonomous vehicles. The abrasion-resistant portion of the door panel is located to prevent scuff-related damage to the door panel when the seat occupant crosses his legs. The abrasion-resistant portion of the door panel may be selectively covered and uncovered by a moveable portion of the door panel such as an armrest. While presented in the context of a front row of seats in the passenger cabin of an autonomous vehicle, the teachings presented herein are applicable to non-autonomous vehicles as well. For example, the unconventional passenger cabin configurations presented here may be employed while a vehicle is parked and/or used with second or third row seating.

Figure 1:
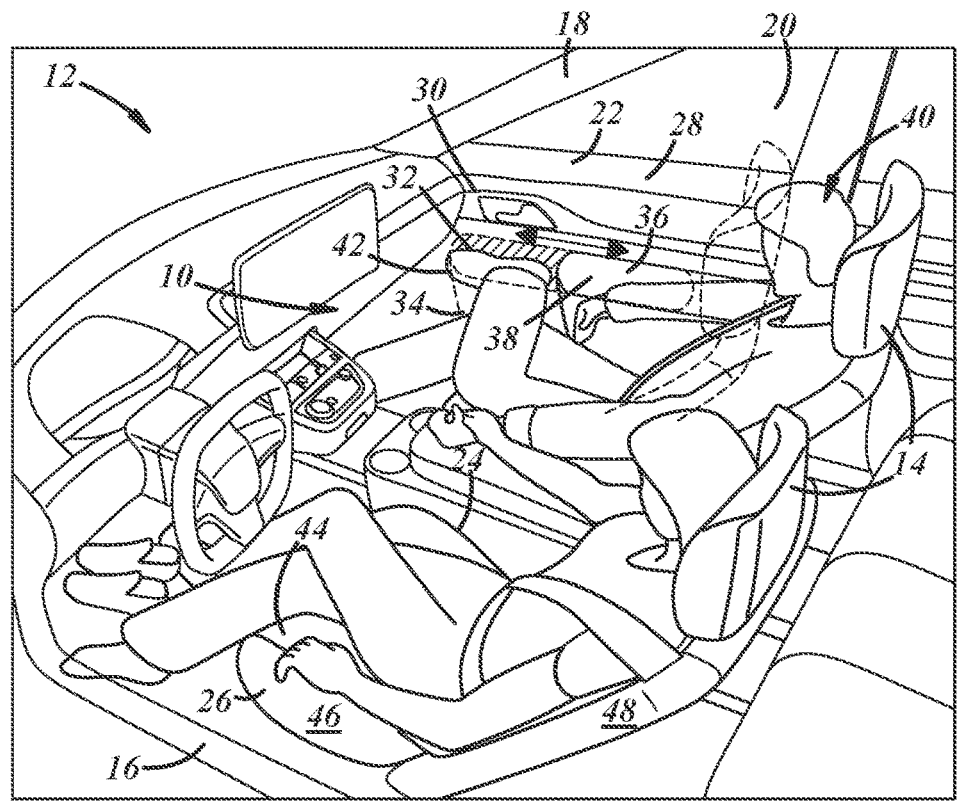
FIG. 1 is a view of an interior of a reconfigurable passenger cabin of a personal automotive vehicle.

FIG. 1 illustrates the interior of a passenger cabin 10 of a personal automotive vehicle 12. As used herein, the term "personal automotive vehicle" is intended to include those types of vehicles intended primarily for personal use that usually have one to three rows of seats and are generally sized to fit in home garages and standard-size parking spaces. Examples include passenger cars, coupes, sedans, SUVs, cross-over vehicles, and light-duty pick-up trucks. The illustrated passenger cabin 10 is reconfigurable between a driving configuration and an autonomous configuration. FIG. 1 shows the passenger cabin 10 configured in one example of an autonomous configuration in which front row vehicle seats 14 are in a position that is farther rearward than in a conventional passenger car. The vehicle 12 includes a vehicle body 16, a door 18 mounted to the vehicle body, and one or more seats 14 located in the passenger cabin 10. The door 18 is mounted to the vehicle body 16 in a movable fashion (e.g., hinged) to provide passenger access into and out of the passenger cabin when the door is moved away from the illustrated closed position to an open position. The door 18 includes a window 20 and a door panel 22 that partly defines the interior of the passenger cabin 10 when the door is closed. The door panel 22 described herein is useful with non-sliding doors and with sliding doors.

Each seat 14 has an inboard side 24 located toward the transverse center of the vehicle 12 and an opposite outboard side 26 located between the inboard side and the nearest door 18. The seats 14 are illustrated in a forward-facing position in FIG. 1 and may be coupled with the vehicle body 16 for rotational movement between the forward-facing position and an inwardly-rotated position as discussed further below.

The door panel 22 has a lower portion 28 below the window 20. Portion 28 is referred to as the lower portion in recognition that there may be some portion of the panel 22 that is not below the window; but in some cases the entire door panel 22 is the lower portion 28. Portion 28 of the door panel 22 includes an upper section 30 that presents an abrasion-resistant portion 32 to the interior of the passenger cabin 10. The abrasion-resistant portion 32 has an abrasion resistance greater than an abrasion resistance of a different portion of the door panel, such as a lower section 34, a moveable portion 36, or a portion directly adjacent the abrasion-resistant portion.

In this embodiment, the door panel 22 includes an armrest 38 as part of the moveable portion 36. The armrest 38 is configured for movement between a first forward position, illustrated in broken lines in FIG. 1, and a second rearward position as shown in FIG. 1. The abrasion-resistant portion 32 is at least partly covered by the moveable portion 36 when the moveable portion is in the first position and is uncovered when the moveable portion is in the second position. As shown in the figure, the abrasion-resistant portion 32 is located along the door panel 22 where the foot of a seat occupant 40 may come into contact with the door panel when the occupant crosses one leg over the other—in particular, when the inboard-positioned leg crosses over the outboard-positioned leg (left-over-right in FIG. 1). In this example, the abrasion-resistant portion 32 is located at a front part 42 of the upper section 30 of the portion 28 of the door panel 22 located beneath the window 20. Stated differently with relation to the vehicle seat 14, the abrasion-resistant portion 32 is located along the door panel 22 at a vertical position above a seating surface 44 of a bottom 46 of the seat and forward of a back 48 of the seat (these elements are labeled on the driver side seat where they are visible in FIG. 1).

Abrasion resistance is determined by ISO testing standards appropriate to the particular material being evaluated. For instance, ISO 17541:2014 is to be used to evaluate abrasion resistance of most plastic materials and ISO 4649:2010 is to be used to evaluate abrasion resistance of most elastomeric materials. Where the material family of the abrasion-resistant portion 32 of the door panel 22 is different from the remainder of the door panel or the portion with which it is being compared, the test standard should be selected based on the portion with which the abrasion-resistant portion is being compared. Where more than one standard is applicable, the abrasion resistance of the abrasion-resistant portion must be greater than the other portion of the door panel by at least one of the test methods. And to be considered greater, the abrasion-resistance must be greater by a statistically significant amount.

The abrasion-resistant portion 32 can be made of any material, or layers of material, which can endure repeated contact with a shoe of a seat occupant. By way of example, the abrasion-resistant portion 32 can have a surface made of hard plastic, or a textile woven with resistant yarns like nylon, glass, or carbon yarns. Real wood or glass can also provide good resistance to abrasion and endure multiple hits. A coating of durable varnish, like bi-component varnish, can enhance the abrasion-resistance of this portion. In addition to the abrasion-resistance, the color and/or the decorative pattern of the portion 32 is preferably not sensitive to dirt. Therefore, it is preferable to avoid for the abrasion-resistant portion surfaces made of suede textiles or made of synthetic leather with a soft haptic.

Figure 2:
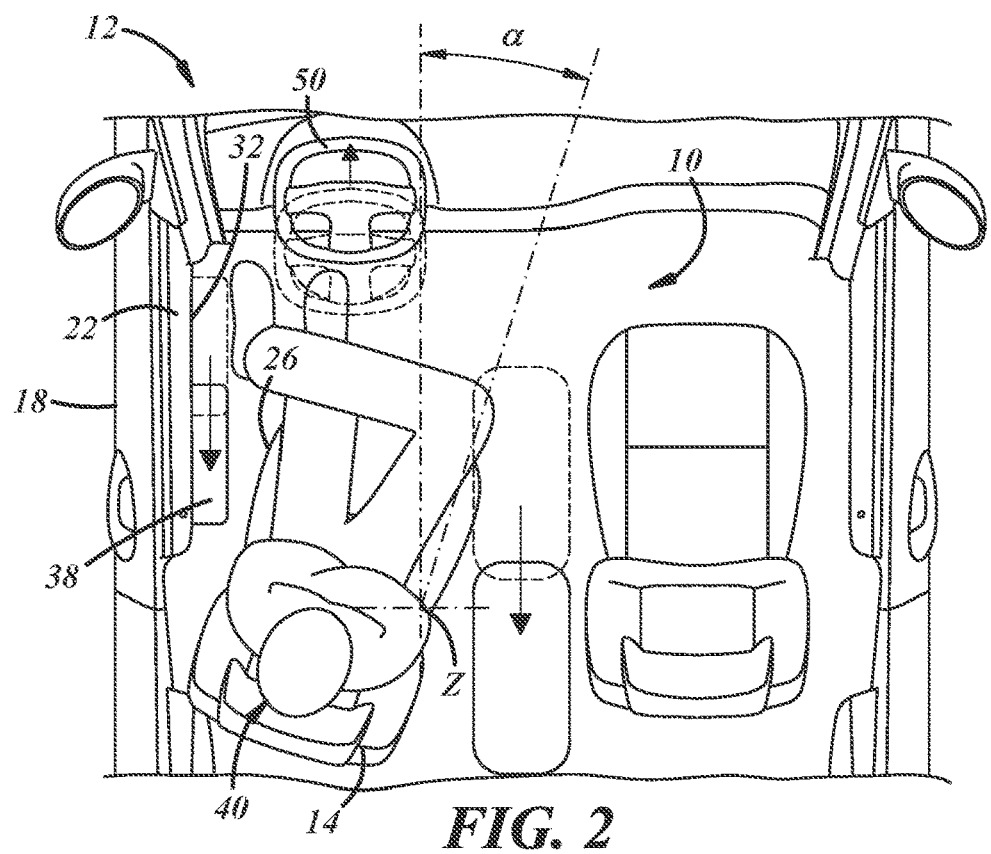
FIG. 2 is a top view of an interior of a passenger cabin illustrating a vehicle seat in an inwardly-rotated position and a door panel with a moveable portion.

The particular door panel 22 of FIG. 1 is illustrated on the passenger side of the vehicle 12 (i.e., no steering wheel) but is applicable to the driver side of the vehicle as well. FIG. 2 is a top view of the front row of a vehicle 12 in another example of the autonomous configuration. In this example, the driver side seat 14 is shown in the inwardly-rotated position with the seat rotated about a vertical axis Z by an angle α of about 15-25 degrees from the forward-facing position (shown in broken lines). The seat 14 is also moved to a rearward position farther away from the front of the vehicle 12 than when in the driving configuration. Other characteristics of the autonomous configuration may include a steering wheel 50 in a retracted position, farther toward the front of the vehicle than when in the driving configuration, and a center console 52 in a stowed position, farther rearward and/or lower than when in the driving configuration.

The inwardly-facing position of the seat may induce the seat occupant 40 to assume a new position different from the position required while driving, particularly after being confined to the driving position for some period of time. Inward rotation of the seat 14 increases the amount of leg room directly in front of the seat occupant 40 and increases the free volume between the outboard side 26 of the seat 14 and the door 18. There may be some psychological effect causing the seat occupant 40 to naturally use the increased space and freedom of movement that becomes available with the seat 14 inwardly rotated. Crossing of the legs is a convenient new position to assume when the space becomes available, and it subjects the door panel 22 to a potentially damaging condition not normally experienced in conventional vehicles. Until now, it has not been necessary to configure door panels for abrasion resistance at such a vertically elevated position. Further, it is quite unconventional to make a portion of the interior of a passenger cabin 10 abrasion-resistant and at least partially cover the abrasion-resistant portion 32—i.e., there is usually no reason to make a covered component abrasion-resistant.

Figure 3:
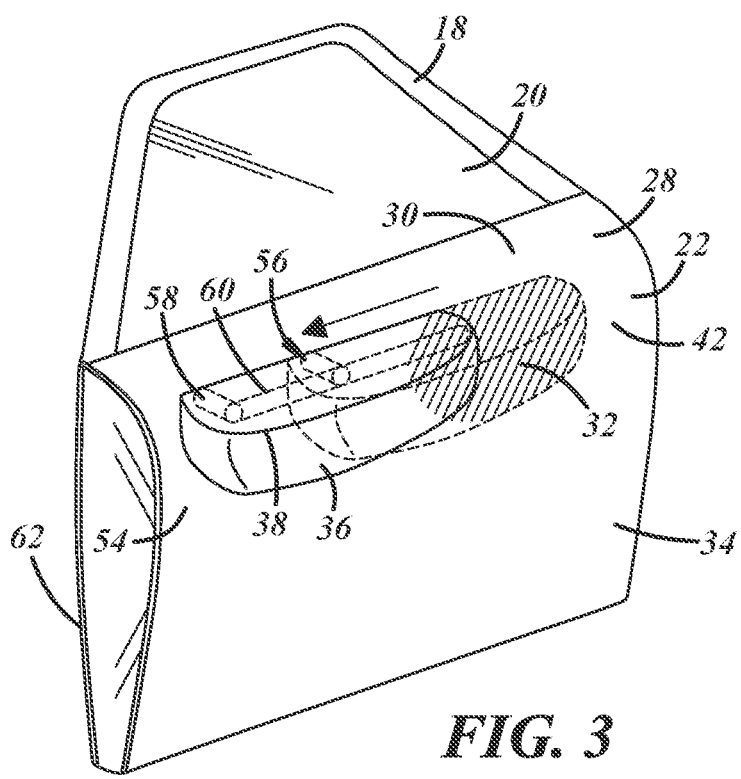
FIG. 3 is a front perspective view of a face of the door panel with an arm rest configured for translational movement to cover and uncover an abrasion-resistant portion.

FIG. 3 is a larger view of an exemplary door 18 and door panel 22 as seen from the interior of the passenger cabin to better illustrate its various features. The illustration is simplified and does not show other door panel features such as a door handle, map pocket, decorative elements, style lines, etc. Many of the features mentioned above in conjunction with FIG. 1 are labeled in FIG. 3 as well, including the lower portion 28 below the window 20, the upper section 30 of the portion 28 beneath the window, the abrasion-resistant portion 32 (shown in cross-hatch), the lower section 34, and the moveable portion 36, which in this case includes the armrest 38. The upper section 30 includes the front part 42 and a rear part 54. The armrest 38 is shown in the second rearward position with the first forward position indicated in broken lines. The abrasion-resistant portion 32 is covered by the moveable portion 36 in the first position and uncovered in the second position. The abrasion-resistant portion 32 is located at the front part 42 of the upper section 30 of the portion 28 of the door panel 22 located beneath the window 20.

Other variations include a moveable portion 36 (e.g., a retractable cover or door) that is separate from a static armrest 38, or a static armrest with the abrasion-resistant portion 32 presented to the interior of the passenger cabin at all times. In another example, the moveable portion 36 includes the abrasion-resistant portion 32. For instance, the moveable portion 36 may include the abrasion-resistant portion 32 extending from the front end of the armrest 38 but concealed behind the front part 42 of the door panel 22 when in the first position such that, when the armrest is moved rearwardly, the abrasion-resistant portion 32 is presented to the interior of the passenger cabin through an opening in the door panel 22.

In the illustrated embodiment, the moveable portion 36 is configured for translational movement with respect to the remainder of the door panel 22 via a movement mechanism 56. In this example, the translational movement is in the forward and rearward directions with respect to the vehicle. Other translational movements are possible, such as upward and downward movement or combinations of different translational directions. The example of FIG. 3 schematically illustrates hidden posts or pins 58 extending from an outboard or back side of the armrest 38 to engage bearing surfaces of a slot 60 along which the pins facilitate sliding movement of the armrest. Various other movement mechanisms are possible, such as wheel-on-rail, tongue-in-groove, rack-and-pinion, etc. The bearing surfaces may be part of the door panel 22 or provided by a structural member between the interior door panel 22 and an exterior door panel 62.

Figure 4:
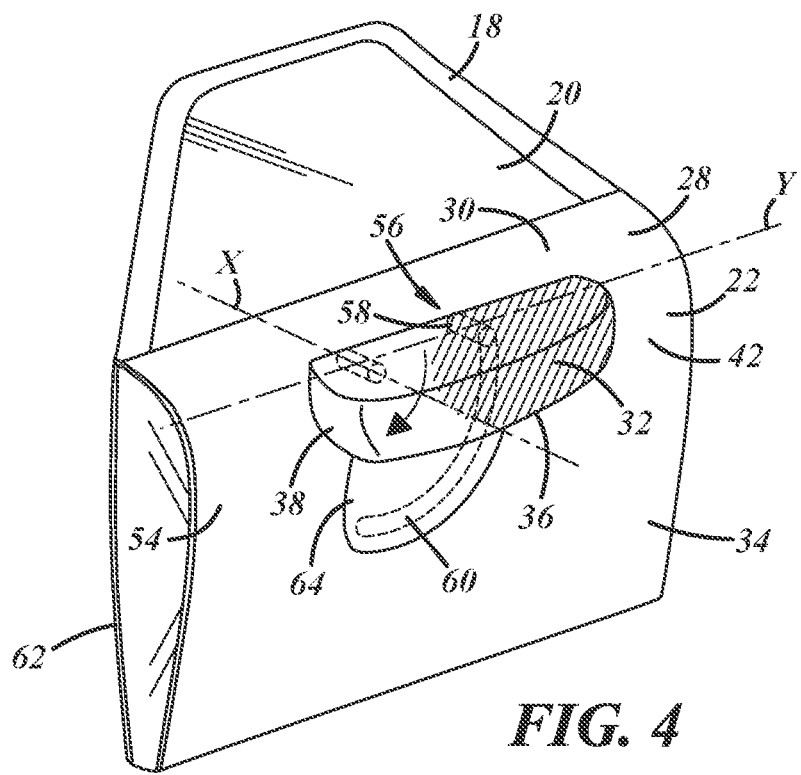
FIG. 4 is a front perspective view of the face of the door panel with an arm rest configured for rotational movement to cover and uncover the abrasion-resistant portion.

FIG. 4 schematically illustrates the door panel 22 of FIG. 3 equipped with a rotational movement mechanism 56 that facilitates movement of the moveable portion 36, including the armrest 38, between a first horizontal position as shown, in which the abrasion-resistant portion 32 is covered, and a second vertical position. The example of FIG. 4 schematically illustrates a post or pin 58 extending from an outboard side of the armrest 38 to engage the bearing surface of a slot 60 along which the pin facilitates sliding rotational movement about a transverse axis X at a static second pin 58'. The moveable portion 36 may include concealing parts 64 to help hide parts of the movement mechanism 56 if necessary or desired. Various other rotational movement mechanisms are possible, and bearing surfaces may be part of the door panel or provided by a structural member between the interior door panel 22 and the exterior door panel 62. In other embodiments, movement of the moveable portion 36 includes a combination of translational and rotational movement. In yet other embodiments, rotational movement may be about a longitudinal axis. For instance, the armrest 38 may be configured to rotate about a longitudinal axis Y from the illustrated first position to a second position in a recess in the door panel. The armrest may be configured to fold up into the door panel body with the abrasion-resistant portion being then presented to the interior of the passenger cabin from the bottom of the armrest.

The reconfigurable passenger cabin 10 may be configured so that the moveable portion 36 of the door panel 22 can only move to the second position to present the abrasion-resistant portion 32 to the interior of the cabin when the appropriate seat is in the inwardly-rotated position. In some cases, there is insufficient room for the seat occupant to cross their legs when the seat is in the forward-facing position. A lock-out mechanism may be provided to facilitate this type of coordinated movement, whether mechanical, electro-mechanical, sensor-based, or some combination thereof. An autonomous vehicle configured for automated changes between the driving and autonomous modes and cabin configurations may be electronically programmed for such coordinated movement, with solenoids or servos providing component movement in response to initiation of a system mode change and/or with sensors or encoders, for example, providing information to a system processor regarding real-time position information about each moving component.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A personal automotive vehicle having a reconfigurable passenger cabin, comprising:
   a vehicle body;
   a door mounted to the vehicle body and moveable to provide passenger access into and out of the passenger cabin, the door comprising a window and a door panel that partly defines an interior of the passenger cabin; and
   a seat located in the passenger cabin and coupled with the body of the vehicle for rotational movement between a forward-facing position and an inwardly-rotated position, the seat having an inboard side and an opposite outboard side located between the inboard side and the door,
   wherein the door panel comprises a lower portion below the window, said lower portion comprising an upper section that presents an abrasion-resistant portion to the interior of the passenger cabin, the abrasion-resistant portion having an abrasion resistance greater than an abrasion resistance of a different portion of the door panel,
   wherein the door panel comprises an armrest configured for movement between a first position and a second position such that a free volume between the outboard side of the seat and the door is greater when the armrest is in the second position than when the armrest is in the first position, and
   wherein the abrasion-resistant portion is not presented to the interior of the passenger cabin in the first position and the abrasion-resistant portion is presented to the interior of the passenger cabin in the second position.

2. A personal automotive vehicle as defined in claim 1, wherein the door panel includes a moveable portion comprising the armrest, the first position is a first position along the door panel, and the second position is a second position along the door panel.

3. A personal automotive vehicle as defined in claim 2, wherein the moveable portion at least partly covers the abrasion-resistant portion in said first position and uncovers the abrasion-resistant portion in said second position.

4. A personal automotive vehicle as defined in claim 2, wherein the moveable portion includes the abrasion-resistant portion.

5. A personal automotive vehicle as defined in claim 2, wherein the movement of the moveable portion comprises translational movement.

6. A personal automotive vehicle as defined in claim 2, wherein the movement of the moveable portion comprises rotational movement.

7. A personal automotive vehicle as defined in claim 2, wherein the moveable portion is configured to be in the second position only when the seat is in the inwardly-rotated position.

8. A personal automotive vehicle as defined in claim 2, wherein the door is a non-sliding door.

9. A personal automotive vehicle as defined in claim 1, wherein the passenger cabin is reconfigurable between a driving configuration, in which the seat is in the forward-facing position and the abrasion-resistant portion is not presented to the interior of the passenger cabin, and an autonomous configuration, in which the seat is in the inwardly-rotated position and the abrasion-resistant portion is uncovered presented to the interior of the passenger cabin.

10. A personal automotive vehicle as defined in claim 9, wherein presentation of the abrasion-resistant portion of the door panel is coordinated with movement of the seat.

11. A personal automotive vehicle having a reconfigurable passenger cabin, comprising:
    a vehicle body;
    a door mounted to the vehicle body and moveable to provide passenger access into and out of the passenger cabin, the door comprising a window and a door panel that partly defines an interior of the passenger cabin; and
    a seat located in the passenger cabin and coupled with the body of the vehicle for rotational movement between a forward-facing position and an inwardly-rotated position, the seat having an inboard side and an opposite outboard side located between the inboard side and the door,
    wherein the door panel comprises a lower portion below the window, said lower portion comprising an upper section that presents an abrasion-resistant portion to the interior of the passenger cabin, the abrasion-resistant portion having an abrasion resistance greater than an abrasion resistance of a different portion of the door panel,
    wherein the door panel includes a moveable portion configured for movement between a first position, in which the abrasion-resistant portion is not presented to the interior of the passenger cabin, and a second position, in which the abrasion-resistant portion is presented to the interior of the passenger cabin, and
    wherein the moveable portion at least partly covers the abrasion-resistant portion in said first position and uncovers the abrasion-resistant portion in said second position.

12. A personal automotive vehicle as defined in claim 11, wherein the moveable portion is configured to be in the second position only when the seat is in the inwardly-rotated position.

13. A personal automotive vehicle as defined in claim 11, wherein the moveable portion comprises an armrest.

14. A personal automotive vehicle as defined in claim 11, wherein presentation of the abrasion-resistant portion of the door panel is coordinated with movement of the seat.

15. A personal automotive vehicle having a reconfigurable passenger cabin, comprising:
a vehicle body;
a door mounted to the vehicle body and moveable to provide passenger access into and out of the passenger cabin, the door comprising a window and a door panel that partly defines an interior of the passenger cabin; and
a seat located in the passenger cabin and coupled with the body of the vehicle for rotational movement between a forward-facing position and an inwardly-rotated position, the seat having an inboard side and an opposite outboard side located between the inboard side and the door,
wherein the door panel comprises a lower portion below the window, said lower portion comprising an upper section that presents an abrasion-resistant portion to the interior of the passenger cabin, the abrasion-resistant portion having an abrasion resistance greater than an abrasion resistance of a different portion of the door panel,
wherein the door panel includes a moveable portion configured for movement between a first position, in which the abrasion-resistant portion is not presented to the interior of the passenger cabin, and a second position, in which the abrasion-resistant portion is presented to the interior of the passenger cabin,
wherein the moveable portion is configured to be in the second position only when the seat is in the inwardly-rotated position.

16. A personal automotive vehicle as defined in claim 15, wherein the moveable portion includes the abrasion-resistant portion.

17. A personal automotive vehicle as defined in claim 15, wherein the moveable portion comprises an armrest.

18. A personal automotive vehicle as defined in claim 15, wherein presentation of the abrasion-resistant portion of the door panel is coordinated with movement of the seat.

19. A personal automotive vehicle as defined in claim 1, wherein the armrest at least partly covers the abrasion-resistant portion in said first position and uncovers the abrasion-resistant portion in said second position.

20. A personal automotive vehicle as defined in claim 5, wherein the translational movement is in forward and rearward directions.

* * * * *